United States Patent [19]

Laborie et al.

[11] 4,038,601
[45] July 26, 1977

[54] DEVICE FOR CONNECTING PERIPHERAL UNITS TO A LINE FOR TRANSMITTING DATA BY PULSE CODE MODULATION

[75] Inventors: Jean-Pierre Laborie, Blagnac; Michel Pévrol, Toulouse, both of France

[73] Assignee: Societe Nationale Industrielle Aerospatiale, Paris, France

[21] Appl. No.: 545,018

[22] Filed: Jan. 29, 1975

[30] Foreign Application Priority Data

Feb. 18, 1974  France .................................. 74.05343

[51] Int. Cl.² ............................................. H04B 1/48
[52] U.S. Cl. ..................................... 325/23; 178/58 R; 333/8
[58] Field of Search ........... 179/2.5 R, 2.5 B, 15 AD, 179/15 BD, 15 BY; 333/6, 8, 10; 325/51, 53, 23; 178/58

[56] References Cited

U.S. PATENT DOCUMENTS

| 2,064,907 | 12/1936 | Green | 325/53 X |
| 2,802,056 | 8/1957 | Affrunti | 179/15 BD |
| 2,861,128 | 11/1958 | Metzger | 179/15 BD |

FOREIGN PATENT DOCUMENTS

| 1,285,557 | 12/1968 | Germany | 179/15 BD |
| 1,248,223 | 9/1971 | United Kingdom | 325/51 |
| 1,239,231 | 7/1971 | United Kingdom | 325/51 |

*Primary Examiner*—Paul L. Gensler

[57] ABSTRACT

The invention relates to a device for connecting peripheral units to a line for transmitting data by pulse code modulation. The transmitter/receiver of such unit is connected to the line through a three-winding insulating transformer having its windings connected to two distinct circuits for connection to the line, one of which is formed by high-value resistors and is assigned to reception and the other by a network of voltage-threshold diodes assigned to transmission.

7 Claims, 8 Drawing Figures

DEVICE FOR CONNECTING PERIPHERAL UNITS TO A LINE FOR TRANSMITTING DATA BY PULSE CODE MODULATION

The present invention relates to electrical multiplex data transmission over cables and more particularly to a device for connecting peripheral units to a line for transmitting data by pulse code modulation (PCM).

A transmission system of this kind includes a one- or two-way transmission line (a shielded or non-shielded twisted two-wire cable or a coaxial cable) and peripheral units or terminal units which said line interconnects. These peripheral or terminal units are parallel-connected to this line and are capable of transmitting and/or receiving said data, the latter being transmitted in the PCM mode.

The requirements for such a system are as follows:

Proper impedance matching irrespective of the number of peripheral units connected to the line.

Galvanic insulation between the transmission line and each peripheral unit.

Preservation of the line in the event of a malfunction affecting any branch connection or peripheral unit (e.g. an open circuit or a short-circuit).

A prior art system of this kind is illustrated diagrammatically in FIG. 1, which shows a two-wire line 2, 3 which is closed at each end onto its characteristic impedance Zc and to which are parallel-connected two peripheral units 11 and 21 through connections 12, 13 and 22, 23 respectively.

Connection methods as shown in FIG. 2 are those most customarily used in the prior art for a two-way line. In such a connection arrangement, the transmitter-receivers 18, 28 of peripheral units 11, 21 are connected to the line 2, 3 through pulse transformers 16, 17 and 26, 27, resistors 14, 15 and 24, 25 being connected between the windings 16, 26 and the line conductors 2, 3 respectively. Galvanic insulation is provided by said pulse transformers. Protection against short-circuits is provided by said resistors, of value R.

In a connection configuration of this kind the input impedance of the peripheral units must be high enough to ensure that mismatching of the line, which is closed at either end on to its characteristic impedance Zc, is not too great even with a large number of peripheral units (30 units, for example). Impedance of the transmitter-receivers 18, 28 is consequently fairly high at reception. On the other hand, transmission takes place at low impedance, with each transmitter delivering into a load equal to $$2R + Zc/2$$

In practice, the line may have a characteristic impedance Zc of the order of 75 ohms and the reception impedance may be 10,000 ohms.

The low transmission impedance is involved only during the transmission sequences since in such transmission systems the transmitters are automatically switched to high output impedance in the absence of any transmission in order not to mismatch the line unnecessarily. Because the messages transmitted by the peripheral units are series messages, only one transmitter at a time operates. Thus there is only one low-impedance transmission point parallel-connected to the line at any moment in time.

In the event of a short-circuit on the branch connection to a peripheral unit, the resulting voltage drop on the line is limited by the resistors 14, 15 or 24, 25, etc., the value R of which is chosen according to the permissible voltage drop.

The drawback with this kind of configuration is that, to limit the voltage drop in the event of short-circuits, the value R of the resistors must be at least of the same order of magnitude as the impedance Zc. Accordingly, there is a considerable dissipation in these resistors during transmission that is directly dependent on the current to be supplied to the line. The power that each transmitter must deliver is thus markedly higher than that actually delivered to the line. Moreover, the line is nonetheless poorly protected against multiple short-circuits, and a double short-circuit will frequently entail the loss of the line in the prior art.

The present invention accordingly has for its object to overcome these disadvantages and to reduce the power which each transmitter must supply to the transmission line, while at the same time minimizing the effects on the transmission line of faults such as short-circuits or circuit openings liable to affect the peripheral units connected to the line.

The invention accordingly provides a device for connecting a transmit/receive peripheral unit to a two-wire line for transmitting data by pulse code modulation. In accordance with the invention, the device includes three connecting circuits, to wit a first circuit whose function is to transmit to the transmission line, a second circuit assigned to reception of the signals transmitted by said line—these two circuits being connected to the line conductors respectively—and a third circuit connected to the transmitter and the receiver of the peripheral unit.

The use of two separate line connection circuits makes it possible to design them with optimum transmission and reception characteristics, respectively. The first circuit establishes connection with the line only when the unit's transmitter sends a signal for transmission to the line, and breaks it when there is no signal to transmit. The link which this circuit establishes is a low-impedance link, so that the transmission power required is reduced. In the absence of transmission, this circuit behaves like an open switch and in no way loads the line even in the event of a short-circuit fault in the transmitter outside transmission periods.

In practice, this connection circuit may be a voltage-threshold circuit which establishes the low-impedance link only when the voltage delivered by the transmitter is greater than a predetermined threshold voltage.

A circuit of this kind, which can readily be devised with the aid of appropriately connected semiconductor diodes, furthermore protects the line in the event of a transmitter short-circuit during transmission, for when this is the case its output voltage becomes very low or null and no longer exceeds the threshold value of the connection circuit, whereby the latter assumes its open state and isolates the line.

Further, the peripheral unit's receiver can be connected to the line conductors through a second connection circuit having an impedance greatly in excess of the characteristic line impedance, which then becomes possible without the need for the transmission power to be increased as a result, since the transmitted signal follows almost exclusively the low-impedance path offered by the first threshold-voltage connection circuit.

Such a high impedance connection circuit can readily be devised by means of resistors of adequate value. It protects the line against any short-circuits that may occur in the receiver, even in the case of multiple short-circuits affecting a plurality of receivers parallel-connected to the line, and this by virtue of its high impedance.

The third connection circuit is preferably formed by a galvanic insulation transformer which transmits the pulses and has three windings, one of them being connected to the peripheral unit's transmitter and receiver when the same have a common pair of access terminals, and the other two being connected to the connection circuits assigned to transmission and reception respectively. If there are distinct pairs of access terminals, such three-winding transformer is replaced by two-winding pulse transformers for respectively connecting the transmitter to the first connection circuit and the receiver to the second connection circuit. A two-winding transformer will likewise be utilized for a peripheral unit which is devoid either of a transmitter or receiver.

The connection configuration according to this invention offers numerous advantages. It results in much lower power dissipation during transmission, the signal transmitted by a peripheral unit no longer having to pass through high-value resistors. It efficiently protects the transmission line against multiple short-circuits, in the latter being able to induce only very low voltage drops thereon because of the high-value resistors in the reception circuit and the disconnecting effect provided by the threshold-type transmission circuit in the event of the transmitted signal having insufficient voltage. This disconnecting effect furthermore enables the number of transmitters connected to the line to be increased without incurring drawbacks, just as the high-value reception resistors make it possible to multiply the number of receivers without incurring an excessive line voltage drop.

Another advantage is the lesser influence of the line's non-resistive loads, by reason of the fact that their impedances are low compared to those of the connection circuits. Further, the voltage drop in the second connection circuit formed by a network of diodes is little dependent on the transmission current. The transmitter and the connection circuit behave like a voltage generator, and the voltage level on the line is less sensitive to load variations.

The description which follows with reference to the accompanying non-limitative exemplary drawings will give a clear understanding of how the invention can be carried into practice.

Figure 5:
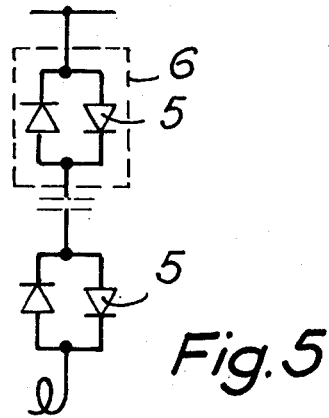
Figure 6:
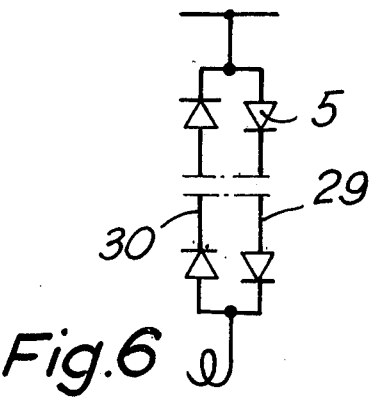
Figure 7:
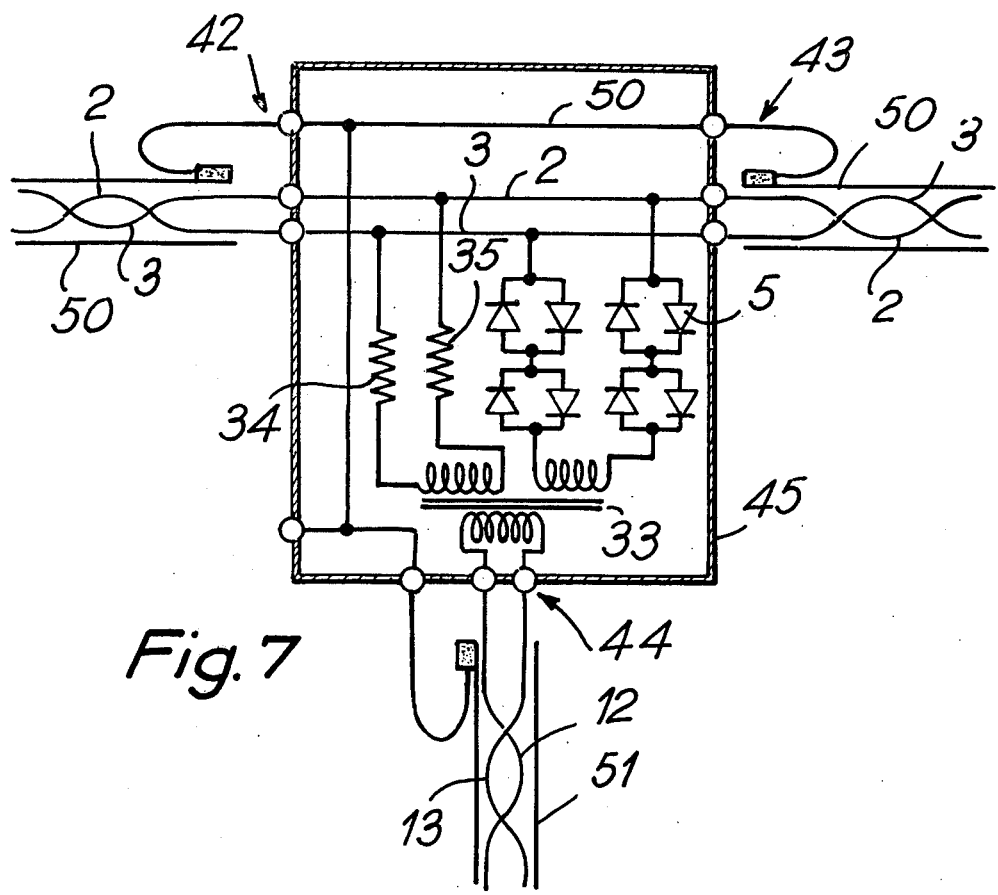
Figure 8:
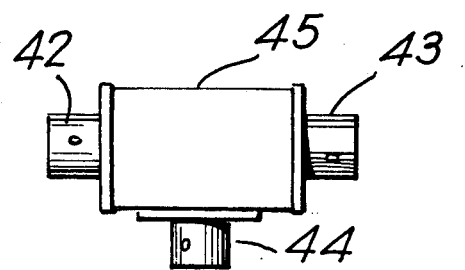

FIGS. 5 and 6 respectively illustrate two methods of grouping the diodes of a connection circuit of the first type; and FIGS. 7 and 8 are respectively a block diagram and physical representation of a device according to the invention for connection to a two-way shielded two-wire line.

Figure 3:
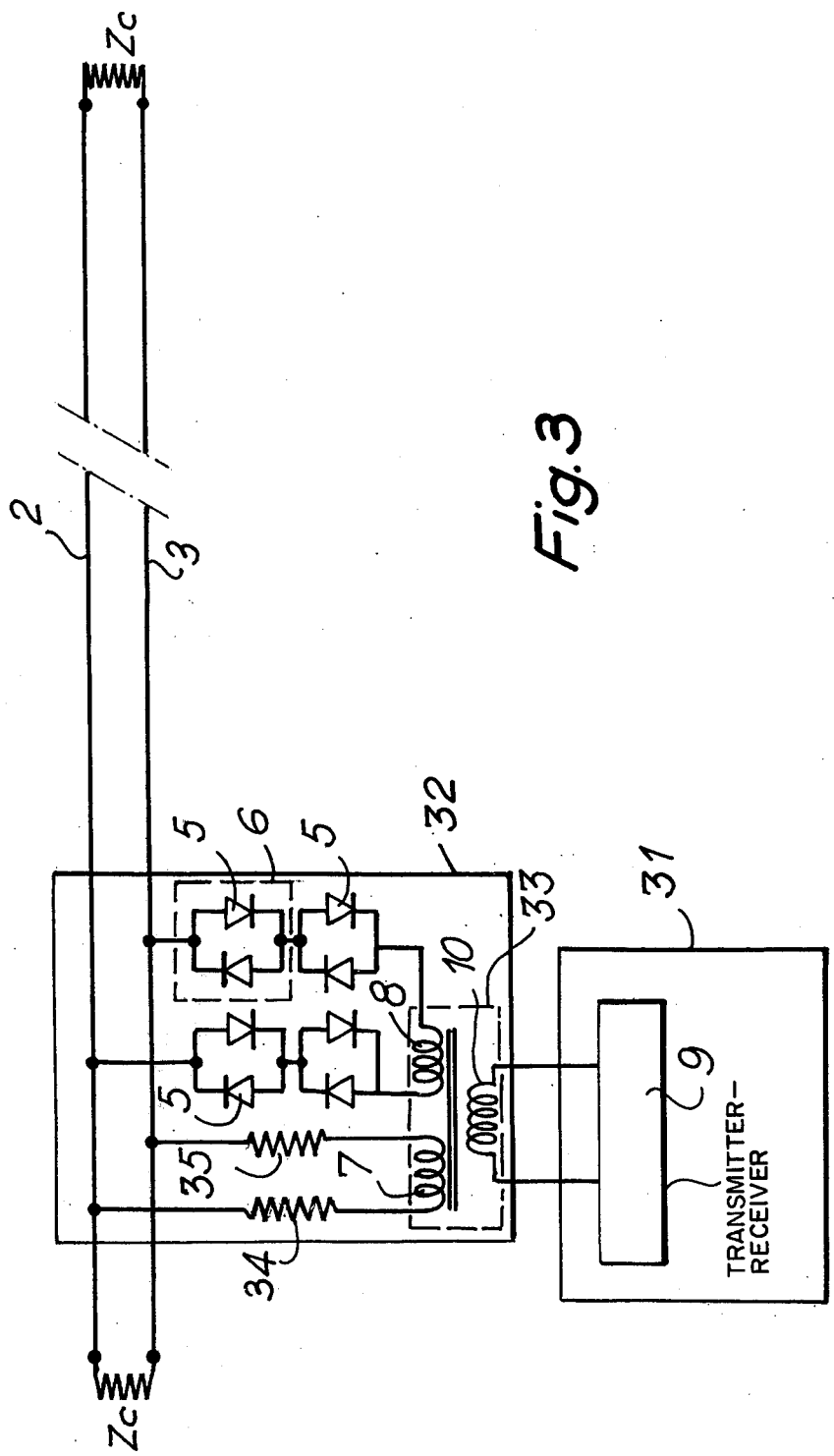
FIG. 3 is an exemplary embodiment of the subject device of the invention whereby to connect peripheral units to a two-way transmission line.

Shown in FIG. 3 is a line 2, 3 of characteristic impedance Zc for connection to a plurality of peripheral units. Only one unit 31 is portrayed, and its transmitter-receiver 9 is connected to line 2, 3 through a connection configuration 32 that includes a pulse transformer 33 with three windings 7, 8 and 10, two resistors 34, 35 for respectively connecting the two ends of winding 7 to the line conductors 2 and 3, and four cells 6 of diodes 5, said cells being series-connected in pairs whereby to connect the ends of winding 8 to conductors 2 and 3 respectively.

Each cell 6 is formed by two diodes 5 parallel-connected head to tail. Winding 10 of pulse transformer 33 is connected to the transmitter-receiver 9 of peripheral unit 31. Alternatively, where the transmitter and receiver of unit 31 have distinct pairs of access terminals, two windings 10 (one for the transmitter, the other for the receiver) may be used.

The diodes 5 may be conventional silicon diodes with a threshold of 0.85 volt. Alternatively, zener diodes with a higher threshold may be used, particularly when the data transmission rate is low and markedly below the usual rate of 1 megabit per second, for which the signal passband is of the order of 5 MHz.

Figure 1:
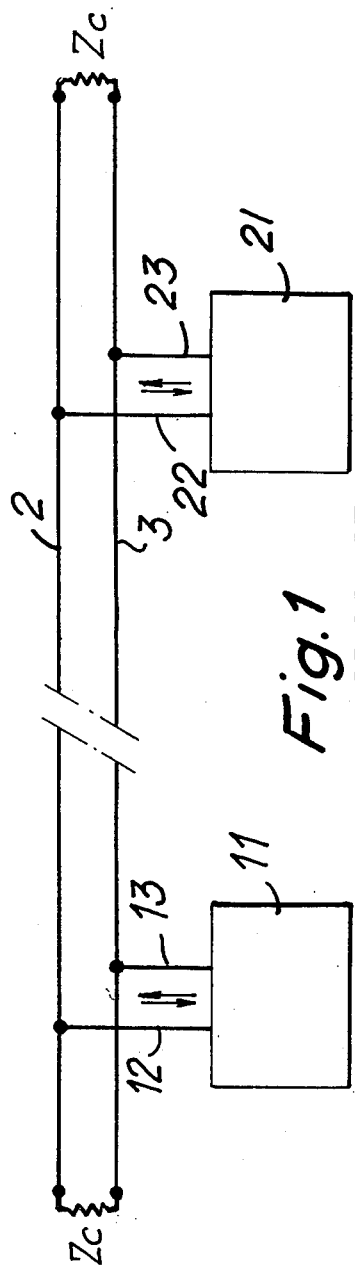
FIG. 1 is a schematic representation of a typical transmission system in accordance with the prior art.
Figure 2:
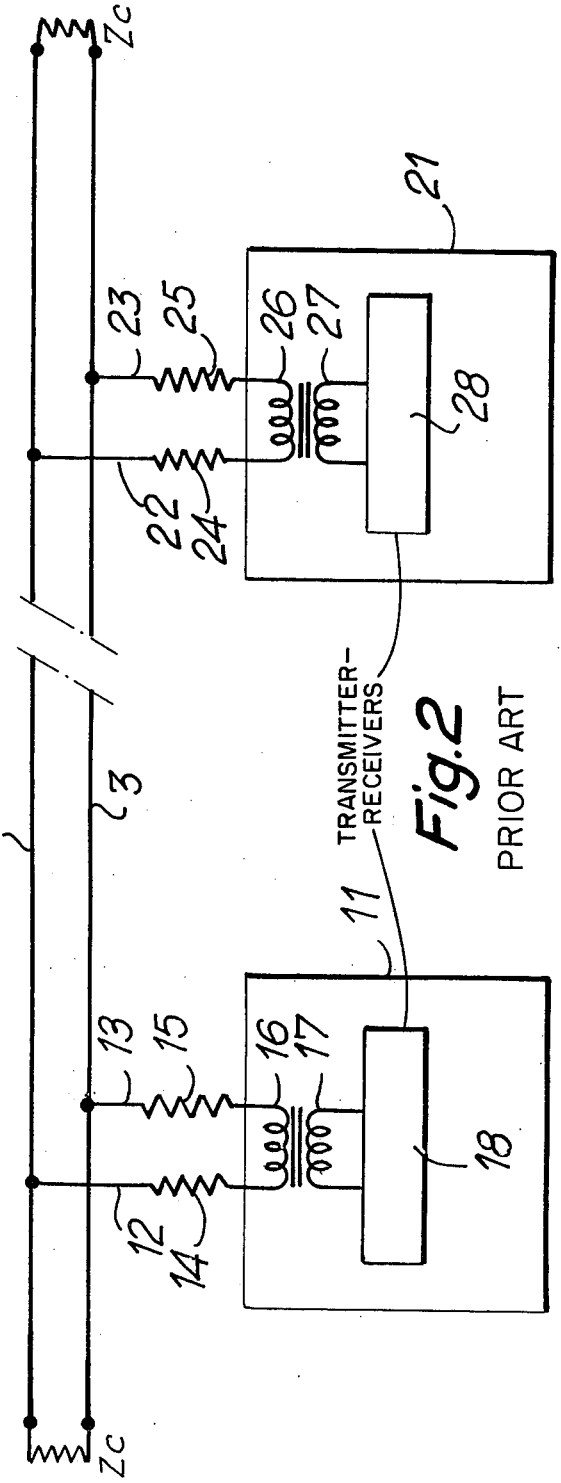
FIG. 2 is also a schematic representation of the prior art type of connections of the transmitter receivers with the transmission line of FIG. 1.

As is clearly shown, galvanic insulation of peripheral unit 31 is provided, as well-known per se, by a pulse transformer 33. However, in accordance with the invention there are provided between said transformer and the transmission line separate connection circuits for transmission and reception that terminate at separate windings 7, 8 of transformer 33. Since reception is effected at high impedance and the connection circuit to the line from winding 7 is used only for reception, it is possible to give the resistors 34 and 35 a much higher value R' than in the example described with reference to FIG. 2, yet retain low dissipation, the currents being minimal. In the event of a short-circuit on the peripheral unit, the impedance perceived by the line is equivalent to a resistance equal to 2R', and since the value of R' is high in relation to the transmission line characteristic impedance Zc, the resulting voltage drop on the line will be low. In practice, R' may have a value of 1000 to 2000 ohms for example when Zc = 75 ohms.

In the matter of transmission, moreover, it may be seen that the current in both directions passes through a determinate number n of diodes 5 equal to 4 in the case of FIG. 3. Each diode clips the base of the signal passing through it by a value equal to its threshold. If T is the threshold voltage of a given diode in the conductive direction and there is a number of diodes n in a circuit, then the overall threshold voltage will be equal to n.T. Since in this case there are four diodes in series in the transmission connection circuit in each current direction, and if recourse is had to conventional silicon diodes having a forward threshold voltage of 0.85V, then the total threshold voltage will be 0.85 $\times$ 4 32 3.4 V. Hence a line signal of voltage below this latter value, equal for example to 3V, will be unable to pass through this group and the latter will behave like an open switch, and in the event of a short-circuit on peripheral unit 31, the voltage drop induced on the line will depend only on the reception circuit's resistors 34, 35, the transmission circuit diodes 5 being blocked. The device retains its advantages even if the threshold voltage is slightly below the line voltage. In the event of a short-circuit on the peripheral unit, the line voltage will be clipped to a value equal to the threshold voltage, which is very close thereto.

When the transmitter of peripheral unit 31 is operative and emits a signal, it must also deliver a signal of voltage equal to approximately twice the on-line signal voltage to enable it to deliver to the line a signal of normal value (3V). But, as explained precedingly, the value R of the resistors customarily used in the prior art has been in the region of Zc, which has meant requiring the transmitter to provide a voltage at last five times higher since it delivers into an impedance of 2R + Zc/2. This example clearly illustrates the saving in power dissipation made possible by the subject device of the invention, which provides almost complete segregation of each peripheral unit with respect to the line in the event of a fault in a unit and yet requires the unit transmitters to deliver only double the normal line signal.

Figure 4:
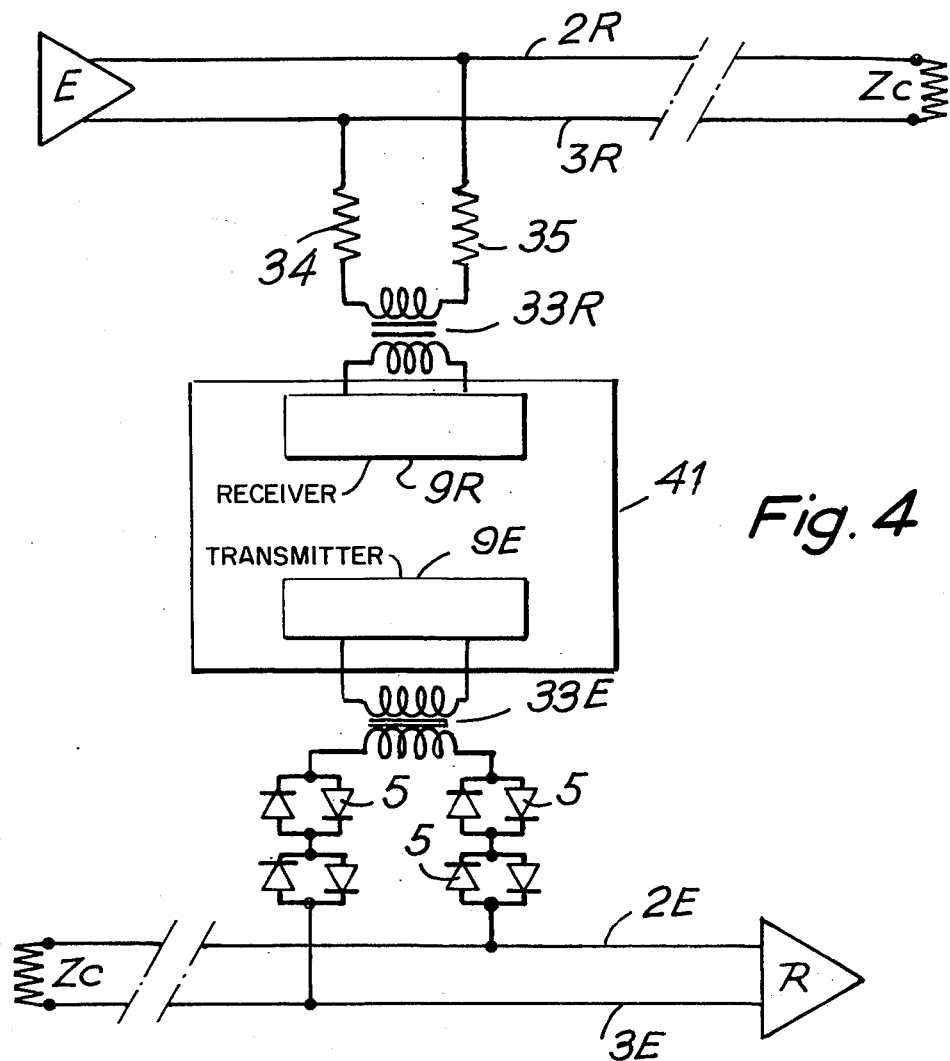
FIG. 4 shows another embodiment permitting connection of peripheral units to one-way transmission lines.

Recourse is next had to FIG. 4 for an illustration of an alternative embodiment of the invention corresponding to the case where a peripheral unit 41 has a transmitter 9E separate from its receiver 9R that have to be respectively connected to a one-way transmission line 2E, 3E terminating at a terminal receiver R and at a one-way reception line 2R, 3R fed by a transmitter E. Transmitter 9E and receiver 9R are connected to the corresponding lines via two-winding individual transformers 33E and 33R, and through connection circuits similar to those of FIG. 3. If desired, windings 33E and 33R may conveniently also be a single four winding transformer. This configuration applies in all cases where a unit's transmitter and receiver have distinct pairs of access terminals.

FIGS. 5 and 6 illustrate two methods of arranging the diodes 5 in each branch of a connection circuit assigned to transmission, to wit either by series-connecting single cells 6 having two head-to-tail diodes or with the use of cells having a plurality of diodes connected in two opposite-direction series 29, 30. Such sets of diodes can readily be devised in the form of integrated circuits in order to ensure small size and high reliability.

FIGS. 7 and 8 illustrate an exemplary embodiment of an arrangement according to the invention for connection to a shielded two-wire line 2, 3, 50. The connection components (diodes 5, resistors 34, 35 and transformer 33) are connected in the same manner as in FIG. 3 and contained in an enclosure 45 having three electrical connectors 42, 43 and 44. Connectors 42 and 43 provide electrical continuity for the two-wire line 2, 3 and the shielding 50. Two-wire line 2, 3 is connected to the two connection circuits assigned to transmission and reception respectively, and one of the windings of transformer 33 is linked to connector 44 which receives a shielded two-wire cable 12, 13, 51 for connection to the peripheral unit's transmitter-receiver. FIG. 8 shows the actual appearance of a device produced in this manner in the form of a single unit having an enclosure measuring 20 × 20 × 30mm.

What we claim is:

1. A device for connecting a peripheral transmitting-receiving unit having an emitter portion for transmitting and a receiving portion for receiving signals to and from a two-conductor transmission line, having a characteristic impedance, said device transmitting and receiving data modulated by coded pulses, comprising in combination:
   a. a first linking circuit connecting said transmission line to said peripheral unit, for the transmission of signals therefrom to said transmission line, said first linking circuit including a low impedance circuit, to establish transmission from said peripheral unit,
   b. a second linking circuit separate and independent from said first linking circuit connecting said transmission line to said peripheral unit for receiving signals from said transmission line, said second linking circuit including a high impedance circuit,
   c. a third linking circuit connected with said first and said second linking circuits and with said peripheral transmitting receiving unit including a transformer electrically connected to the emitter and receiver portions of said peripheral unit, and
   d. said first linking circuit including at least one group of semi-conducting diodes connected in series and electrically connecting one of the conductors of said two conductor transmission line and with said third linking circuit.

2. The device as claimed in claim 1, said first linking circuit further including a second group of semi-conducting diodes connected in series and electrically connecting the other of said conductors of said two conductor transmission line with said third linking circuit.

3. The device as claimed in claim 1, wherein each said groups of diodes consists of two diodes, said two diodes being connected in parallel with their polarities reversed.

4. The device as claimed in claim 1, wherein each said groups of diodes includes a plurality of diodes connected in two opposite directions in series.

5. The device as claimed in claim 1, wherein said third linking circuit includes a pluse transformer and said peripheral unit includes a single pair of access terminals connected to both said emitter portion and said receiving portion, said pulse transformer including a first pair of windings connected with said single pair of access terminals and a second pair of windings one of said windings of said second pair being connected with said first linking circuit and the other of said windings of said second pair being connected with said second linking circuit.

6. The device as claimed in claim 1, wherein said second linking circuit includes at least one resistor electrically connecting one of the conductors of said two conductor transmission line in series with said third linking circuit, said resistor having an impedance substantially higher than said characteristic impedance of said transmission line.

7. The device as claimed in claim 6, said second linking circuit further including a second resistor electrically connecting the other of the conductors of said two conductor transmission line with said third linking circuit, said second resistor being in series connection with said other conductor and said third linking circuit, said second linking circuit having an impedance substantially higher than said characteristic impedance perceived by said transmission line when said peripheral unit is short-circuited which impedance is equivalent to the sum of the impedances of said one and said second resistors.

* * * * *